United States Patent Office 3,510,563
Patented May 5, 1970

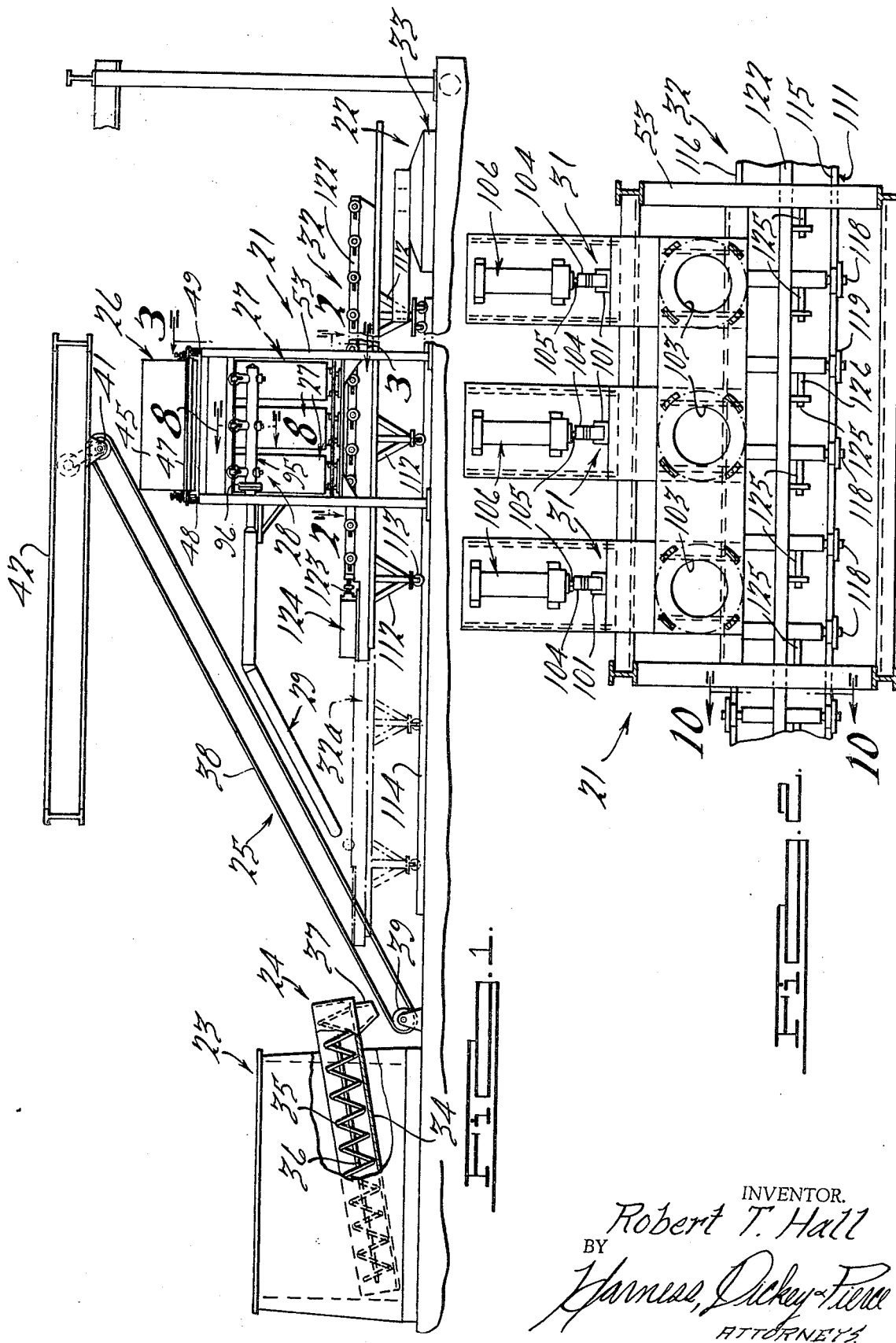

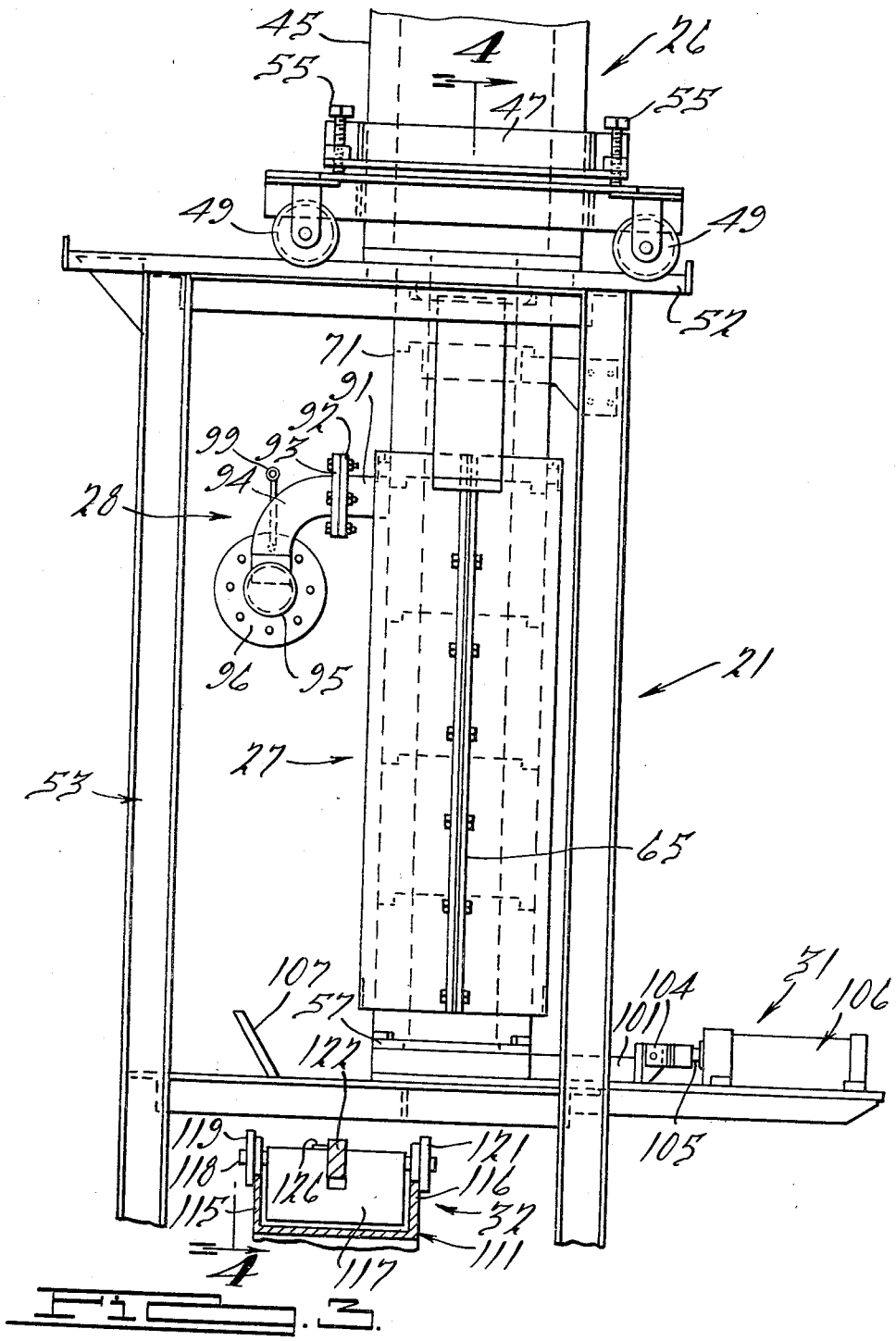

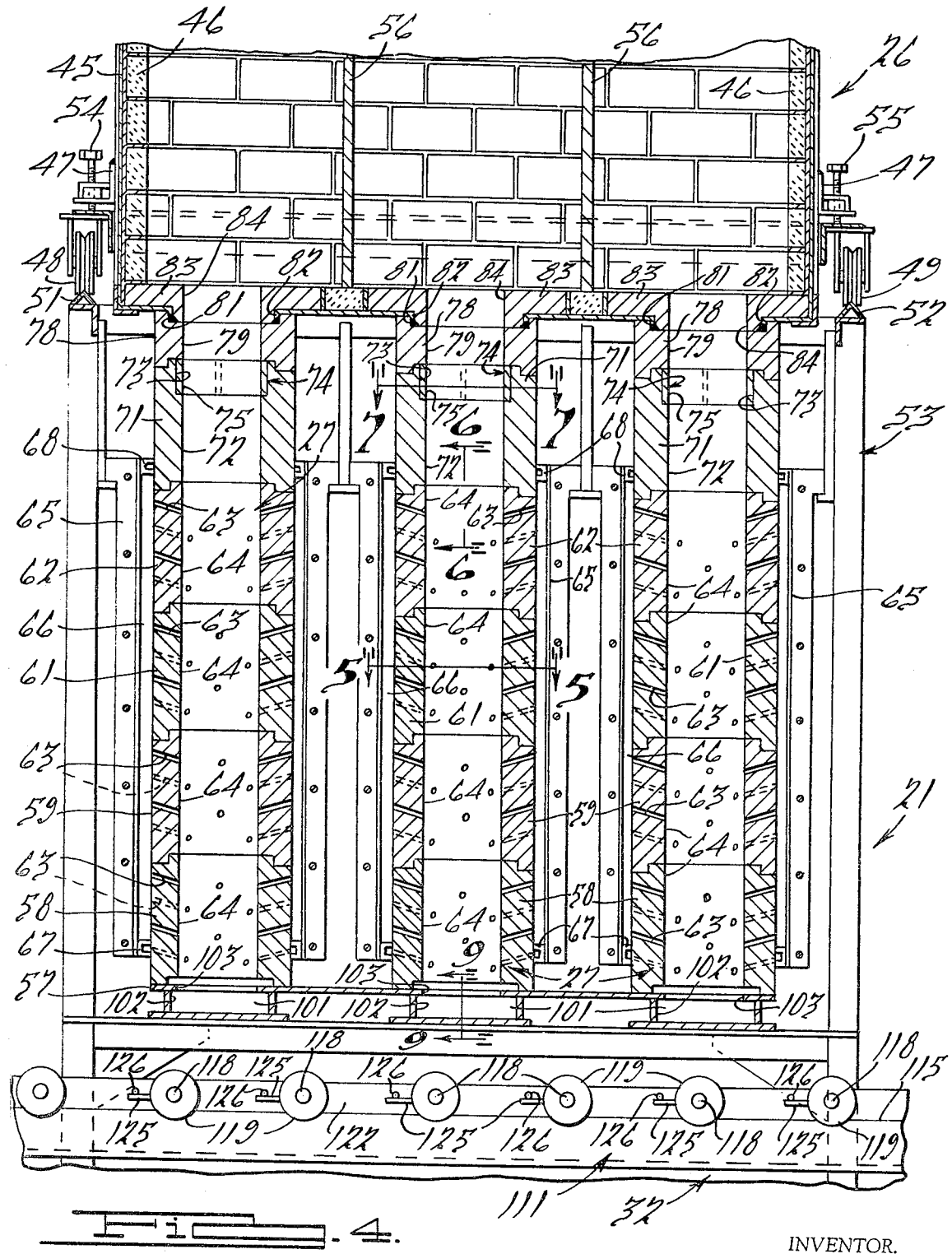

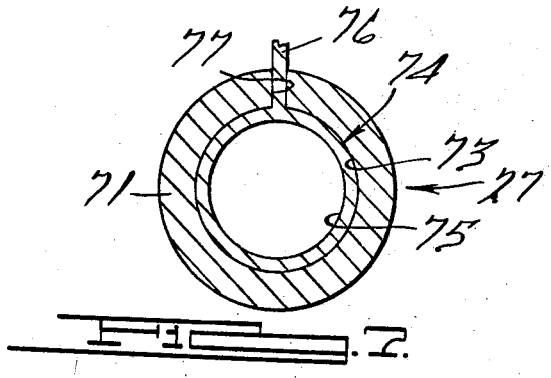
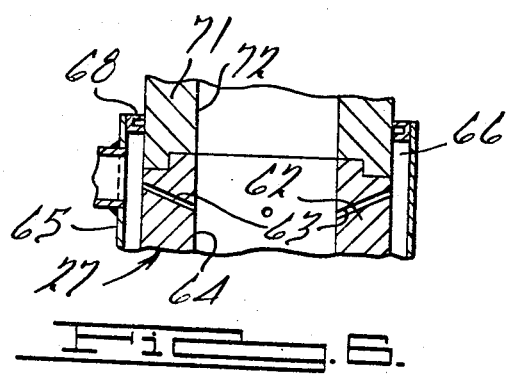
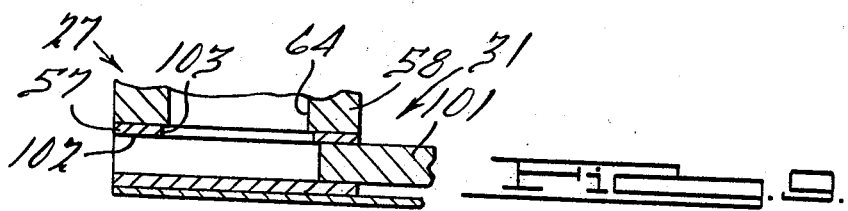
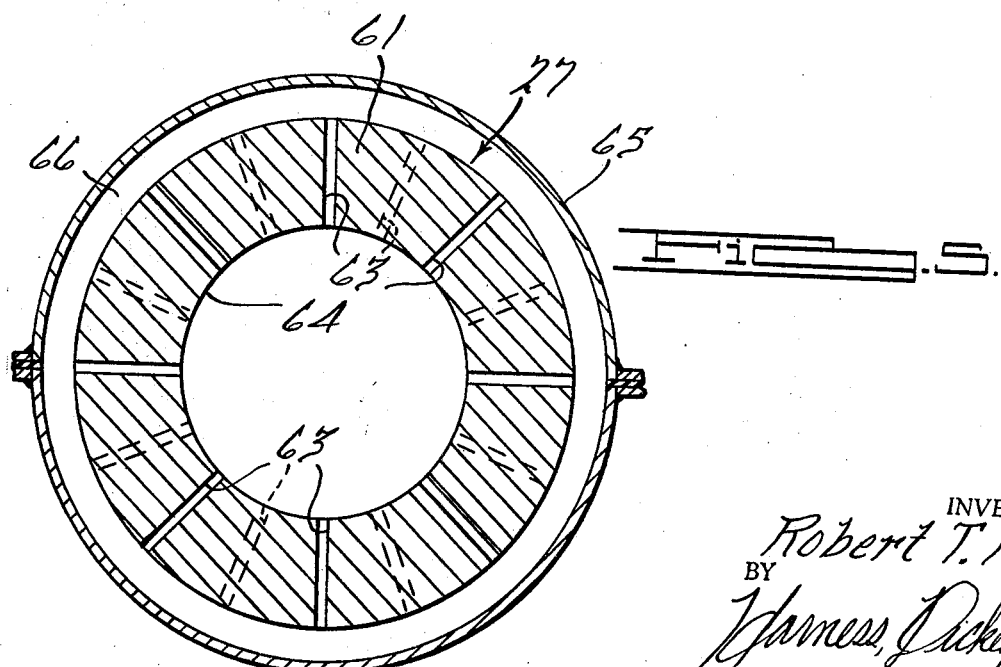

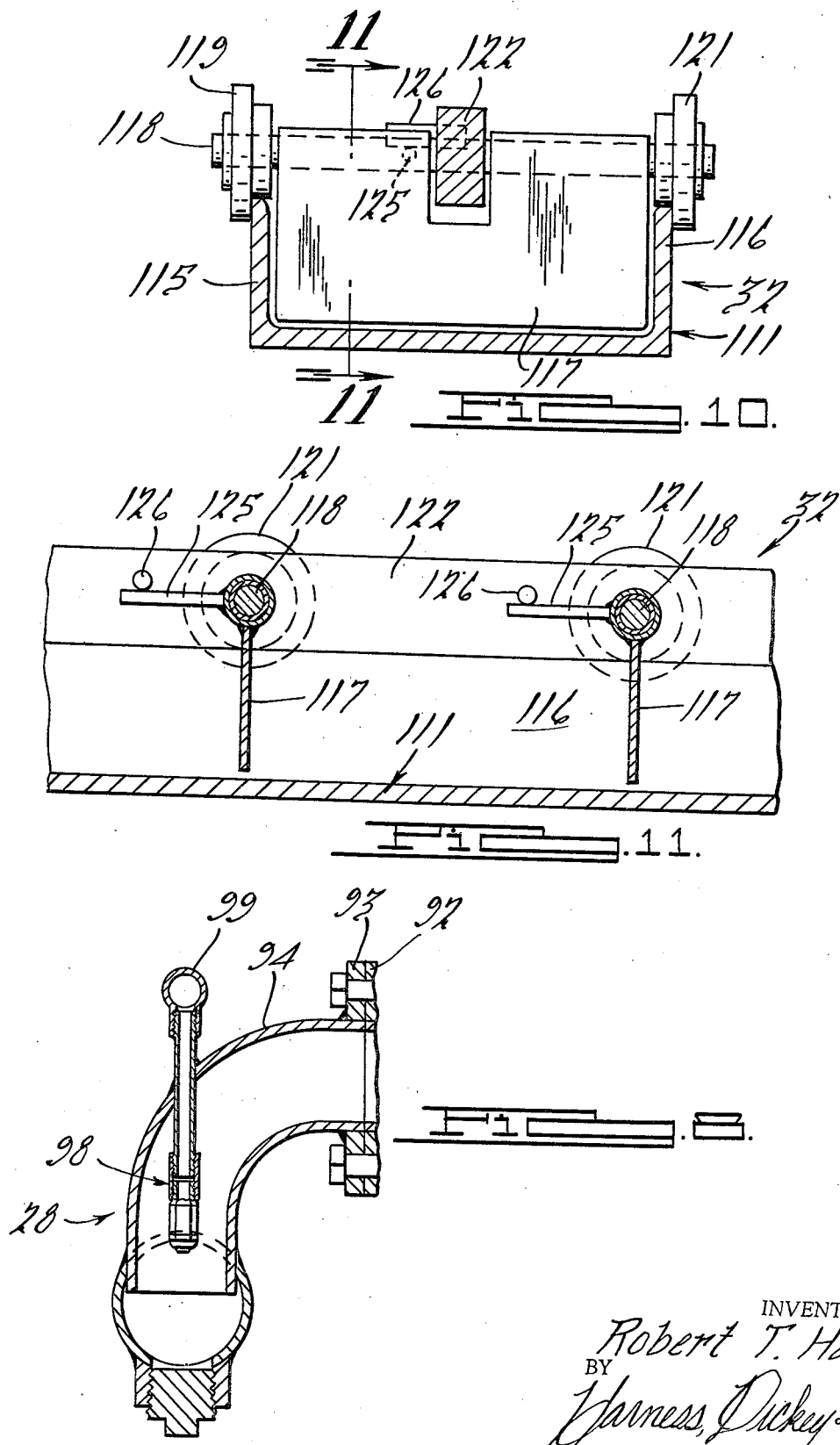

3,510,563
CHIP DRYING METHOD AND APPARATUS
Robert T. Hall, Orchard Lake, Mich., assignor to Kelsey-Hayes Company, a corporation of Delaware
Filed May 3, 1968, Ser. No. 726,415
Int. Cl. C21b 5/00, 11/00; H05b 3/66
U.S. Cl. 13—22                                    17 Claims

ABSTRACT OF THE DISCLOSURE

An apparatus for removing cutting fluids or other liquids from metal pieces generated by machine tools and for preheating the pieces for subsequent remelting within a furnace or for compaction by a briquetting machine. The apparatus is particularly adapted for use in foundries where machining operations take place and includes a drying device that passes an electrical current through the wet pieces for vaporizing the liquid and separating it from the pieces. A conveyor delivers the wet particles to the drying device and another conveyor delivers the heated, dry particles to a furnace or briquetting machine. The vaporized liquid removed from the particles is drawn off through a plenum, is cooled by the introduction of a water spray and is subsequently recovered by condensation and impingement, or is consumed in an afterburner.

BACKGROUND OF THE INVENTION

This invention relates to a method and apparatus for drying an electrically conductive mass containing solid particles and liquid and more particularly to an improved method and apparatus for drying metal particles recovered from machine tools.

Most metal working operations result in the formation of chips or borings which are removed from a casting or the like by a cutting tool. These pieces are normally wetted by the cutting or flushing fluids used in connection with the machine tool and by other fluids which may leak from the machine. Due to the high moisture content, the pieces have little utility as discharged from the machine tool. Attempts to remelt the pieces without some adequate form of drying have been unsuccessful since the liquid in the pieces causes an extreme fire and smoke problem if the wet pieces are immediately discharged into a remelt furnace. Mechanical efforts to remove the liquid from the pieces, such as by centrifuging, have not been particularly successful due to their relative inefficiency.

Rather than remelting the metal pieces, it may be desirable in some instances to compact them through the use of a known form of briquetting device. This compaction also necessitates the drying of the metal pieces by removal of the liquid.

It is, therefore, a principal object of this invention to provide an improved method and apparatus for removing liquid from a mass containing a mixture of the liquid and solid particles.

It is another object of this invention to provide a method and apparatus for drying the metal pieces generated by machining operations.

It is a further object of this invention to provide a method and apparatus whereby metal pieces generated by a machining operation may be remelted efficiently and without fire or smoke hazards.

It is yet another object of this invention to provide a method and apparatus for drying and heating metal pieces for subsequent remelt or for compaction by a briquetting apparatus.

It is still another object of the invention to provide a method and apparatus for heating and drying metal pieces without creating air pollution.

Generally, the method and apparatus disclosed herein achieves a drying of the metal pieces by heating the pieces sufficiently to drive off the unwanted liquids. In addition to rendering the pieces reusable for remelting, this manner of drying raises the temperature of the pieces sufficiently so as to reduce the remelt time required. This has the effect of greatly increasing the capacity of the remelt furnace. The manner of heating and drying disclosed herein also limits the oxidation of the metal pieces so that upon remelting there is increased furnace refractory life and reduced slag generation. The method and apparatus also makes possible the use of a 100% metal particle charge into induction furnaces. Alternatively to remelting, the heated, dried metal particles may be compacted by a briquetting apparatus.

SUMMARY OF THE INVENTION

A method embodying this invention is particularly adapted for drying a mass of electrically conductive particles, which mass contains liquid in the interstices between the particles and adhering to the individual particles. This method employs passing of an electric current through the mass, which current is sufficient to raise the temperature of the mass to a temperature at which the liquid to be removed will vaporize. The vaporized liquid is drawn off leaving a relatively dry, heated accumulation of particles.

An apparatus for performing the method described in the immediately preceding paragraph includes a container for receiving the mass to be dried. A pair of spaced terminals are adapted to be positioned in electrical contact with the mass and power means are provided for passing an electrical current across the terminals and through the mass between the terminals to heat the mass.

BRIEF DESCRIPTION OF THE DRAWINGS

FIG. 1 is a side elevational view, with portions broken away, of an apparatus embodying this invention, which apparatus is particularly adapted to perform a method that also embodies the invention.

FIG. 2 is an enlarged sectional view, taken generally along the line 2—2 in FIGURE 1.

FIG. 3 is an enlarged end elevational view looking generally in the direction of the line 3—3 of FIGURE 1.

FIG. 4 is a cross-sectional view taken along the line 4—4 of FIGURE 3.

FIG. 5 is an enlarged cross-sectional view taken along the line 5—5 of FIGURE 4.

FIG. 6 is an enlarged cross-sectional view taken along the line 6—6 of FIG. 4.

FIG. 7 is an enlarged cross-sectional view taken along the line 7—7 of FIG. 4.

FIG. 8 is an enlarged cross-sectional view taken along the line 8—8 of FIG. 1.

FIG. 9 is a cross-sectional view taken along the line 9—9 of FIG. 4.

FIG. 10 is an enlarged cross-sectional view taken along the line 10—10 of FIG. 2.

FIG. 11 is a cross-sectional view taken along the line 11—11 of FIG. 10.

DETAILED DESCRIPTION OF THE PREFERRED EMBODIMENT

Referring first to FIGS. 1 and 2, a chip drying apparatus embodying this invention and particularly adapted for use in a foundry is identified generally by the reference numeral 21. The apparatus 21 is adapted to dry chips or borings formed during metal working operations by removing the cutting fluids from the chips or borings. Incident to this drying operation, the chips are heated and may be delivered to a remelt furnace, indicated generally by the reference numeral 22, for reuse.

Generally the apparatus 21 is comprised of a bin 23 to which the chips from various machine tools are delivered and in which these chips, that are wetted with cutting and flushing fluids or oils, as well as fluids which may leak from the machines, are stored. A screw type conveyor 24 delivers the chips from the bin 23 to a belt type conveyor 25 which, in turn, periodically or continuously conveys the mass of wet chips to a hopper 26. The hopper 26 is disposed above a series of vertically oriented dryers 27 in which the chips are dried. The liquid removed from the chips is drawn off through a manifold 28 and conduit 29 for reclamation by means of a condenser (not shown), or for consumption within an afterburner or the like. The heated, dryed chips are removed from the dryer 27 by a series of pusher units 31, each of which delivers the chips to a discharge conveyor 32. The discharge conveyor 32 transfers the heated chips to the furnace 22 through an opening in its lid 33. Alternatively, the heated, dried chips may be delivered to a briquetting machine of any known type by the conveyor 32.

Feed conveyors

The bin 23 may be of any suitable configuration and may have an open top into which the wet chips or borings are delivered in any suitable manner. The screw conveyor 24 consists of an open top tube 34 in which an auger 35 is supported for rotation upon a shaft 36. The tube 34, auger 35 and shaft 36 are inclined upwardly from the bottom of the bin 23. A discharge chute 37 is formed at the outer end of the tube 34 adjacent the lower end of the belt conveyor 25. The shaft 36 is coupled to an electric motor or other prime mover and is operated either intermittently or continuously to rotate the auger 35 and deliver chips from the bin 23 to the lower end of the belt conveyor 25 through the discharge chute 37.

The belt conveyor 25 consists of an endless belt 38 that is trained around a drive pulley 39 at its lower end and an idler pulley 41 at its upper end. The idler pulley 41 is journaled on an overhead beam 42 in any suitable manner. The drive pulley 39 is driven by an electric motor or other prime mover and is operated either intermittently or continuously and preferably simultaneously with the operation of the screw conveyor 24. When the conveyors 24 and 25 are operated, wet chips are transferred first from the bin 23 onto the lower end of the belt conveyor 25, and subsequently from the upper end of the belt conveyor 25 into the hopper 26 where the chips fall by gravity.

Dryer

The hopper 26 (FIGS. 3 and 4) is comprised of a generally rectangular outer sheet metal supporting frame 45. The frame 45 is lined with refractory bricks or tiles 46 and is formed with an open top to receive the wet chips delivered by the belt conveyor 25. The frame 45 carries structural angles 47 around its periphery, which angles are supported, at two sides of the hopper 26, upon roller assemblies 48 and 49 that coact with tracks 51 and 52, respectively. The tracks 51 and 52 are carried by a gantry or frame 53 that encircles the dryers 27 and which supports these dryers, in a manner which will become more apparent as this description proceeds. Screw type lifting devices 54 and 55 interconnect the angles 47 with the rollers 48 and 49 so that the hopper 26 may be raised from a position in registry with the dryers 27 and moved transversely along the tracks 51 and 52 to one side of the dryers 27 for servicing. Vertically extending refractory or insulating walls 56 subdivide the hopper 26 into a number of compartments equal to the number of dryers 27. The walls 56 terminate vertically beneath the upper end of the hopper 26 so that they will not interfere with the charging of each of the respective dryers 27.

Each of the dryers 27 is substantially the same in configuration and construction and, therefore, only one of these units will be described in detail, particular reference being had to FIGS. 3 through 7. A horizontally extending plate 57 extends beneath the dryers within the gantry or frame 53. The dryers 27 are comprised of a first series of generally cylindrical refractory elements 58, 59, 61 and 62 that are affixed to each other in any known manner common in the furnace art. To assist in the connection, the refractory elements 58, 59, 61 and 62 may be formed with a cylindrical boss at one end and a counterbore like section at the other end as clearly shown in FIG. 4. Each of the refractory elements 58, 59, 61 and 62 is formed with a plurality of circumferentially and axially spaced gas flow passages 63, which passages extend radially through the refractory elements from their inner bores 64 to their outer peripheries. The passages 63 are inclined somewhat to the horizontal—that is, the passages 63 incline upwardly from the bore 64 to the outer periphery of the refractory elements. A shroud 65 encircles the refractory elements 58, 59, 61 and 62 for the portion of their length through which the passages 63 open. The shroud 65 defines an annular chamber or plenum 66 that surrounds these refractory elements and which is closed at its opposite ends by means of seals 67 and 68.

Above the refractory element 62, a somewhat like shaped refractory element 71 is positioned. The refractory element 71 also defines a cylindrical bore 72; however, the refractory element 71 is not formed with any radially extending gas flow passages. The upper end of the refractory element 71 is relieved, as at 73 (FIG. 7), to receive an electric terminal 74. The terminal 74 has a generally cylindrical shape and defines a bore 75 that is substantially concentric with the bores 64 and 72. The cylindrical portion of the terminal 74 is formed with an outwardly extending bus bar portion 76 that extends through an axially extending slot 77 formed in the refractory element 71 adjacent its upper end. A short cylindrical refractory element 78 is positioned above the refractory element 71 and coacts with the element 71 to hold the terminal 74 in place. The element 78 also defines a cylindrical bore 79 that is concentric with the bores 72 and 64 and is formed with a stepped portion 81 that receives a downwardly extending cylindrical segment 82 of a refractory 83 that forms, in part, the lower wall of the hopper 26. The refractory 83 has a cylindrical opening 84 through which wet chips may flow from the hopper 26 into the bores 79, 72 and 64 of the respective refractory elements.

The terminals 74 are each connected to one side of a source of suitable electric power, for example an A.C. current. The base plate 57 is connected to the opposite terminal so that a voltage potential is established between the plate 57 and terminals 74. The resultant current flow passes through the particles that are stacked in the dryer 27 between the lowermost refractory 58 and the refractory 71. The current flow is such that the chip and liquid mass contained within the dryers 27, which is electrically conductive, will be resistively heated. The period of heating, as will become more apparent as this description proceeds, is continued for sufficient time to insure that the mass will be elevated to a temperature sufficient to effect vaporization of the liquid or to some predetermined preheat temperature.

Vapor removal system

The plenums 66 surrounding each of the dryers 27 receive the gaseous vapors driven from the metal chips by the resistance heating of these chips, as has been noted. These vapors enter the plenums 66 through the passages 63. The manifold 28, which receives these vapors and discharges them, is comprised of outlet fittings 91 that extend into respective of the plenums 66 through the shroud 65 adjacent its upper end. Each outlet fitting 91 is flanged as at 92, for attachment to a mating flange 93 of a curved manifold pipe 94. Each of the pipes 94 forms a part of a gas collector 95 that is flanged at its outlet end, as at 96, for connection to the conduit 29.

Since a large percentage of the liquids removed from the pipes by the dryers 27 may constitute hydrocarbon oils and since these oils are in the gaseous phase and at an elevated temperature, there is a possibility of spontaneous ignition occurring in the exhaust manifold 28 and conduit 29. To preclude this possibility, water is sprayed into the curved manifold pipes 94 by means of nozzle assemblies 98 (FIG. 8). The nozzle assemblies 98 are positioned immediately adjacent the point of vapor discharge and are fed with high pressure cold water by a water manifold pipe 99. The water spray will cool the gases sufficiently to prevent self-ignition from occurring in the manifold 28 or conduit 29. As has been previously noted, the conduit 29 leads to a condenser and/or impingement filter which may be of any type. The condenser serves to reclaim the removed liquids wherein the water may be separated in any known manner so that the oils can be reused. In addition, the condenser insures that little or no pollutants will be discharged to the atmosphere from the apparatus 21.

If it is not desired to reclaim the oil or other liquid separated from the metal chips by the dryers 27, these fluids and particularly the oils may be consumed by an afterburner of any known type (not shown). The use of such an afterburner in lieu of a means for reclamation will also insure that no pollutants are discharged to the atmosphere. If such an afterburner is employed, it may be unnecessary to introduce the cooling water spray into the manifold 28. If the water spray is not employed, care must be taken to insure against air leakage into the manifold 28 and conduit 29 to prevent self-ignition.

Discharge conveyor system

As has been noted, pusher assemblies 31 serve to remove the heated, dried chips from the dryers 27. Each of the pusher assemblies 31 (FIGS. 3, 4 and 9) comprises a generally rectangular pusher bar 101 that is guided in a complementary opening 102 formed in the frame beneath the plate 57. Apertures 103 are formed in the plate 57 beneath each of the bores 64 in the lowermost refractory element 58. The heated chips may, therefore, flow by gravity from the refractory bores 64 through the plate openings 103 to the openings 102 when the pusher bars 101 are in their retracted position as shown in FIG. 9.

The pusher bars 101 are each connected, as by a coupling 104, to a piston rod 105 of a respective hydraulic or pneumatic cylinder assembly 106. Operation of the cylinder assembly 106 will cause the pusher bars 101 to reciprocate from their retracted position as shown in FIG. 9 to an extended position wherein the pusher bar 101 moves to the left as viewed in this figure to the outer end of the opening 102. When the pusher bar 101 is in this extended position, the heated, dried chips will be forced outwardly toward a baffle plate 107 (FIG. 3) that is positioned to one side of the dryers 27 and above the discharge conveyor 32. The chips are then free to fall into the discharge conveyor 32.

The discharge conveyor 32 (FIGS. 1 through 4, 10 and 11) is comprised of an elongated channel shaped trough 111 that is supported on a plurality of upstanding leg assemblies 112 each of which carries a roller 113 at its lower end. The rollers 113 coact with spaced tracks 114 so that the discharge conveyor 32 may be moved longitudinally for a reason which will become more apparent as this description proceeds.

The trough 111 is open at the top and is defined by a pair of spaced, vertically extending legs 115 and 116. A plurality of vanes 117 depend into the trough 111. Each of the vanes 117 is pivotally journaled upon a shaft 118 that carries stepped trolley wheels 119 and 121 at its opposite ends. The trolley wheels 119 and 121 are supported on the upper ends of the trough legs 115 and 116, respectively. An elongated operating bar 122 carries shafts 118 and is coupled at its rearwardmost end to a piston rod 123 of a hydraulic or pneumatic cylinder assembly 124. Reciprocation of the piston rod 123 will cause the operating bar 122 to be reciprocated longitudinally of the trough 111.

Each of the vanes 117 carries a stop arm 125 that is adapted to engage a stop pin 126 fixed to the pusher bar 122 (FIG. 11). When the stop arm 125 is engaged with the pin 126, the vanes 117 will be held in a vertical orientation and rotation of the vanes relative to the shafts 118 in a clockwise direction as viewed in this figure will be precluded. The vanes 117 are, however, free to rotate in the counterclockwise direction.

The drawings illustrate the discharge conveyor 32 in its retracted position. In this position, chips will be disposed in the trough 111 in the front of the vanes 117. When the cylinder 124 is operated and the piston rod 123 moves outwardly, the vanes 117 will exert a pushing force on the chips and the chips adjacent the outermost vane 117 will be forced from the outer end of the trough 111 into an opening formed in the cover assembly 33 of the furnace 22. When the piston rod 123 is again retracted, the vanes 117 will pivot in a counterclockwise direction relative to the respective shafts 118 and ride over the tops of the chips until the piston rod 123 and pusher bar 122 reach the other extreme limit of their stroke. Upon the next outermost reciprocation of the piston rod 123 and pusher bar 122, the vanes 117 will dig into the chips until the vanes 117 reach their vertical position and are held against further movement by the contact of the arm 125 with the stop pin 126. The chips will then be moved again along the trough 111.

If it is desired to obtain access to the furnace 22, or to tilt the furnace 22, the entire discharge conveyor 32 may be moved along the tracks 114 to a retracted position as shown by the dotted line view identified by the reference numeral 32a in FIG. 1. In this position, the outer or discharge end of the discharge conveyor 32 will be disposed substantially under the dryers 27 and free of the furnace cover assembly 33.

Operation

In operation, each of the dryers 27 is filled with wet chips by operating the screw conveyor 24 and belt conveyor 25 until the dryers 27 are filled and until the hopper 26 is substantially filled. The electric current is then passed between the terminals provided for by the grounded plate 57 and upper terminals 74. The passage of this current will cause the chips and liquid to be heated until the liquid in the chips is vaporized. The vaporized liquid is drawn off through the passages 63, plenum 66, manifold 28 and conduit 29. A suitable fan or pump may be interposed in the conduit 29 to assist in drawing off of these vapors. As has been previously noted, the vapors are cooled by the spray nozzle 98 and subsequently reclaimed by the condenser or disposed of in an afterburner.

The drying operation is continued until the chips at the lowermost end of each of the dryers 27 have been dryed sufficiently. The desired degree of dryness will be indicated by a rise in the current flow through the vertical stack of chips since the resistance of the mass decreases in proportion to the dryness of the mass. When the desired degree of dryness is reached, the pusher assemblies 31 are operated to remove the lowermost charge of chips in each of the respective dryers 27. It should be noted that each of the pusher assemblies 31 may be operated independently of the others since certain of the dryers 27 may dry faster than the others. After one or more of the pushers 31 have been operated, the discharge conveyor 32 may also be operated to transfer the chips along the trough 111 to the furnace 22.

The condition of the chips dryed by the described dryers 27 particularly adapts these chips for use in remelt furnaces and particularly an induction furnace. The oxidation of the chips during heating and drying is minimized since there is little opportunity for air spaces to exist in the vertically oriented completely filled dryers 27. Since little oxidation can occur, slag generation in the furnace 22 is reduced to a minimum and furnace refractory life is increased. In addition, since the chips have not only been dryed but have been heated, the remelt time in the furnace 22 will be substantially reduced with an effected increase in the capacity of the furnace 22.

As has been noted, the discharge conveyor 32 may transfer the heated, dryed chips to a briquetting device of any known type if remelting is not necessary. Many of the advantages of the dryers 22 such as good drying, heating and low oxidation, are also advantageous in connection with subsequent briquetting. In addition, regardless of the final use of the chips, finely divided particles will not be lost due to the absence of high velocity gas streams.

When the level of chips in the hopper 26 falls below a predetermined point, the conveyors 24 and 25 will be operated to replenish the hopper 26. The conveyors 24 and 25 may be operated continuously at a rate sufficient to maintain the necessary level in the hopper 26.

Although the apparatus has been described in conjunction with the drying of metal chips or borings, it is to be understood that it may be used advantageously to dry and/or preheat larger pieces of metal scrap. Such larger pieces may advantageously be mixed with the borings and dryings. For example, slugs removed from larger pieces by punch presses or the like may be added to the chips in the bin 23 or may be added at any other appropriate location in the feed system or directly to the hopper 26. The addition of such larger particles, which may be also wetted, will speed the start up time.

It is also to be understood that it may be desirable to equip the unit with a variable voltage power supply to compensate for variations in the electrical resistivity of the mass to be dryed and to regulate the output and temperature of the discharged particles. If a constant current power supply or similar unit is used, larger scrap and various grades may be handled by the apparatus.

It should be understood that the respective conveyors 24, 25 and 32 and the pushers 31 may be operated at the direction of an operator or the entire operation may be automated. The sequence of operation is dependent primarily upon the heating time in the dryers 27 and the apparatus may be recycled either upon the sensing of a predetermined current flow through the chip mass or at a given time interval. The electrical and hydraulic apparatus used to perform the sequential operation described may take various forms and detailed description of this portion of the apparatus 21 has been omitted since this portion of the apparatus forms no part of the invention. It is also to be understood that variations in the operating sequence as well as other changes and modifications will present themselves to those skilled in the art. Such changes and modifications are to be considered within the scope of the invention, as defined by the appended claims.

What is claimed is:

1. The method of drying a mass of electrically conductive particles in a container having an inlet end and a discharge end which mass contains a liquid in the interstices between the particles and adhering to individual particles, introducing the mass into the container through its inlet end, passing an electric current through the mass, the current so passed being sufficient to raise the temperature of the mass to a temperature at which the liquid to be removed will vaporize, removing the vaporized liquid from the remaining mass, and removing the dryed particles from the discharge end, the electric current being passed through the mass in a direction generally parallel to the path the mass flows between the inlet and discharge ends of the container.

2. The method of claim 1 wherein the particles comprise metal pieces, the drying method further serving to heat the pieces for subsequent use and further including the step of conveying the heated dryed pieces to an apparatus for performing a further operation on the pieces.

3. The method as set forth in claim 2 wherein the apparatus for performing the further operation on the heated, dryed pieces comprises a remelt furnace.

4. The method of claim 1 wherein the vaporized liquid is removed by subjecting the mass to a reduced pressure for drawing off the vaporized liquid.

5. The method of claim 4 wherein the vaporized liquid is flammable and further including the step of cooling the vaporized liquid below its flash point at the point of removal from the mass.

6. The method of claim 5 wherein the liquid is cooled by introducing a water spray to the liquid.

7. A drying apparatus to separate a liquid from an electrically conductive mass containing solid particles and liquid intermingled with each other, said apparatus including a container for receiving the mass, a pair of electrode terminals supported by said container in spaced relationship to each other and in electrical contact with the mass, electrical means for passing an electrical current across the electrode terminals and through the mass between the electrode terminals for heating the mass to a temperature sufficient to cause the liquid to vaporize, and means for removing the vaporized liquid from the container.

8. An apparatus as set forth in claim 7 wherein the container has an inlet opening for receiving the mass and a spaced outlet opening through which the dryed mass is removed.

9. An apparatus as set forth in claim 8 wherein the electrode terminals are positioned adjacent the inlet and outlet openings, respectively, whereby the current flows in a path substantially parallel to the path of the mass from the said inlet opening to said outlet opening.

10. An apparatus as set forth in claim 8 further including an inlet conveyor for delivering the mass to said inlet opening and discharge conveying means for conveying the heated dryed solid particles away from the outlet opening.

11. An apparatus as set forth in claim 8 wherein the means for removing the vaporized liquid comprises spaced passages formed in the walls of the container and a plenum chamber surrounding said container at least in part and into which said passages open.

12. An apparatus as set forth in claim 11 wherein the liquid is flammable and further including means for introducing a cooling water spray into the means for removing the vaporized liquid from the container for cooling the liquid.

13. An apparatus as set forth in claim 11 wherein the walls of the container are formed from a refractory material, the passages being formed in said refractory material.

14. An apparatus as set forth in claim 7 wherein the apparatus is adapted to be used in connection with an apparatus for performing a subsequent operation on the particles, the solid particles comprising metal pieces and the liquid comprising fluid hydrocarbons, and further including conveying means for conveying the heated dryed metal pieces from the container to the apparatus for performing the subsequent operation.

15. An apparatus as set forth in claim 14 wherein the apparatus for performing the subsequent operation on the heated, dryed metal pieces comprises a remelt furnace.

16. An apparatus as set forth in claim 14 wherein the container is formed from a refractory material and defines an inlet opening and a discharge opening, the conveyor being disposed adjacent said discharge opening, the terminals being disposed adjacent said inlet opening and said discharge opening whereby the electric current flows in the path substantially parallel to the direction the pieces flow from said inlet opening to said discharge opening.

17. An apparatus for heating and drying a mass of metal particles containing fluid hydrocarbons, said apparatus comprising a generally vertically extending refractory container, said container being open at its upper end and open at its lower end with said upper end forming an inlet opening and said lower end forming a discharge opening, a first electrical terminal disposed within said container adjacent said inlet opening, a second electrical terminal disposed adjacent said discharge opening, means for passing an electrical current between said electrical terminals and through the mass positioned within said container for heating said mass to a temperature sufficient to cause the fluids to vaporize, said refractory container being formed with passages extending from the mass to the exterior of said container, means defining a plenum chamber surrounding the portion of said container in which said passages are formed for receiving the vaporized liquid passing from said container through said passages, an exhaust manifold extending from said plenum chamber to the atmosphere, nozzle means for introducing a water spray to said manifold adjacent said plenum chamber for cooling the vaporized fluid hydrocarbons below their flash point, reciprocating pusher means disposed adjacent said discharge opening for sequentially forcing dryed metal particles from said container, a discharge conveyor disposed adjacent said pusher means for receiving the heated dryed particles and for transferring said chips to an associated apparatus, and inlet conveyor means for conducting the mass of particles and fluid hydrocarbons to said inlet opening.

References Cited

UNITED STATES PATENTS

| | | | |
|---|---|---|---|
| 121,245 | 11/1871 | Haserick | 75—44 |
| 935,686 | 10/1909 | Prince | 75—44 |
| 1,574,878 | 3/1926 | Gail | 75—44 |
| 2,035,282 | 3/1936 | Schmeller | 266—33 |
| 2,059,229 | 11/1936 | Gregg | 75—44 |
| 2,150,984 | 3/1939 | Near | 266—33 |
| 2,977,255 | 3/1961 | Lowry | 266—33 |
| 3,025,333 | 3/1962 | Perieres | 13—20 |
| 3,025,385 | 3/1962 | Tanaka | 13—20 X |
| 3,202,408 | 8/1965 | Huhtala | 266—33 |
| 3,234,010 | 2/1966 | Mahony | 75—44 |

H. B. GILSON, Primary Examiner

U.S. Cl. X.R.

13—22